E. FULLER.
SUSPENSION SPRING FOR VEHICLES.
APPLICATION FILED NOV. 12, 1914.
1,140,671.
Patented May 25, 1915.
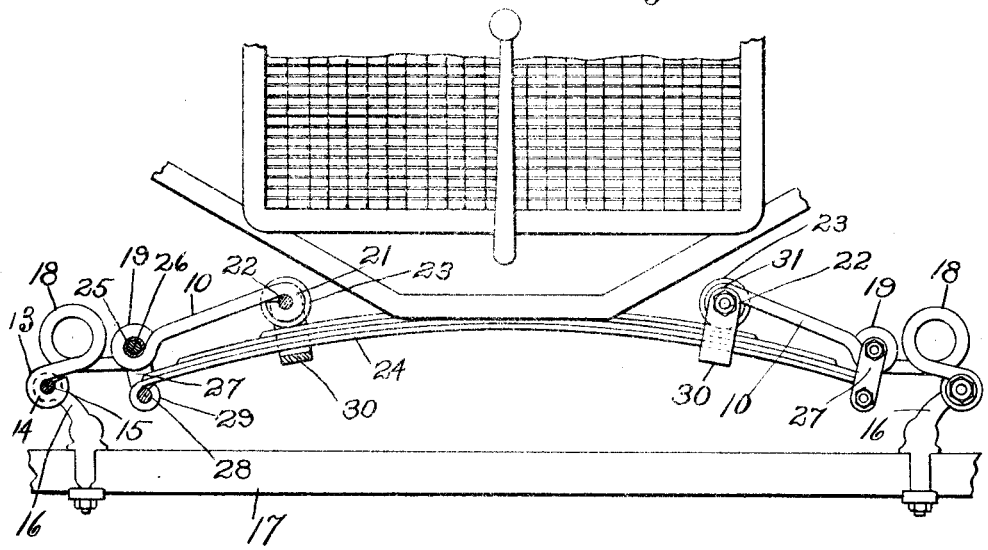
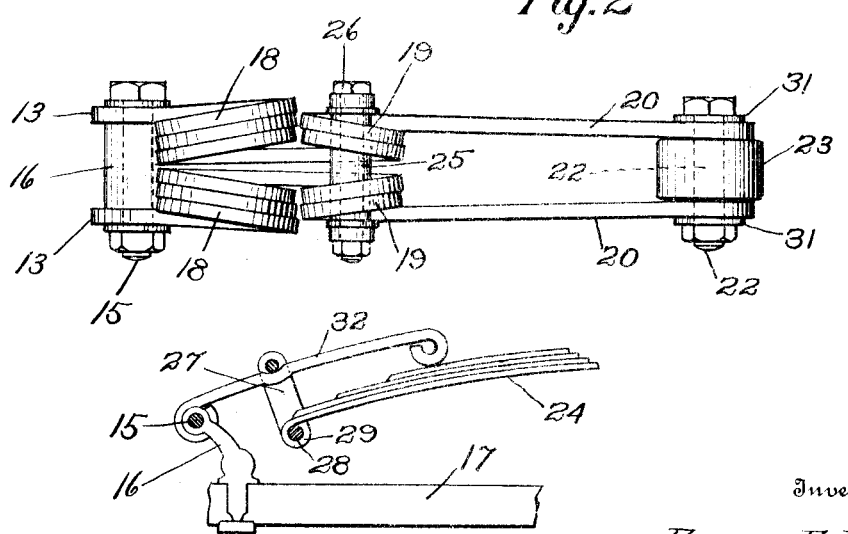
Witnesses
W. W. Bardsley.
A. J. Macready.
Inventor
Eugene Fuller
By Howard E. Barlow
Attorney

UNITED STATES PATENT OFFICE.

EUGENE FULLER, OF PROVIDENCE, RHODE ISLAND, ASSIGNOR OF ONE-THIRD TO CHARLES F. BUTTERWORTH, OF PAWTUCKET, RHODE ISLAND, AND ONE-THIRD TO JOSEPH WEBB, OF THORNTON, RHODE ISLAND.

SUSPENSION-SPRING FOR VEHICLES.

1,140,671.  Specification of Letters Patent.  Patented May 25, 1915.

Application filed November 12, 1914. Serial No. 871,650.

*To all whom it may concern:*

Be it known that I, EUGENE FULLER, a citizen of the United States, and resident of the city of Providence, in the county of Providence and State of Rhode Island, have invented certain new and useful Improvements in Suspension-Springs for Vehicles, of which the following is a specification.

This invention relates to auxiliary springs arranged as shock absorbing devices for vehicles, of the class adapted to coöperate with the main spring of the vehicle to prevent excessive reaction of the same, and the invention has for its object to provide a yieldable member at the ends of the springs from which spring ends are suspended, one end of each of said members being supported from a base, and its opposite end supported on the back of the main spring, the end of the main spring being connected to said member at a point intermediate its ends for the purpose of obtaining greater yieldability in and preventing excessive rebound of the spring.

A further object of the invention is to increase the yieldability of said supporting member by interposing one or more coils therein intermediate its ends.

The invention further consists in the forming of a coil in said member to which the end of the main spring is connected.

With these and other objects in view, the invention consists of certain novel features of construction, as will be more fully described, and particularly pointed out in the appended claims.

In the accompanying drawings: Figure 1—shows my improved shock absorbing device as applied to the ends of a transversely arranged spring. Fig. 2—is a plan view showing the arrangement of the spring members, the same being enlarged over that shown in Fig. 1. Fig. 3—is a modification illustrating the simplest possible form of my improved device as applied to a vehicle spring.

The particular form of shock absorbing device herein illustrated is more particularly adapted for use on a vehicle which is provided with transverse springs, but I do not limit its use to this spring arrangement, and the device may be applied to such a vehicle by the use of the parts already in use in the suspension of the spring and without drilling holes in the parts of the vehicle.

With reference to the drawings 10 designates the auxiliary spring or shock absorbing device which is preferably constructed of two spring wire members arranged spaced apart and side by side and to lie substantially parallel with the axis of the spring. The end 13 on each of these members is preferably bent into the form of an eye through which a bolt 15 is passed into the bracket 16 and by which they are pivotally supported, the bracket being preferably secured to the axle 17 of the vehicle. Each wire from this pivot point is led forward and slightly upward and wound into a large coil 18 having one or more convolutions formed on the inner side thereof, then leaving the inner edge of this coil the wire again extends forward and is again wound into two or more convolutions as at 19, this time on the outside of the wire, from the outer edge of this coil the wire again extends forward forming an elongated arm portion 20, the extremities of which are bent into the form of an eye, see Fig. 1, to receive the bolt 22, which serves as a bearing on which the contact roll 23 is adapted to rotate.

In order to connect the main spring 24 of the vehicle to this auxiliary spring or shock absorbing device, I preferably insert a bushing 25 through the coils 19 of both of the side members, see Fig. 2, and then pass the bolt 26 through the links 27 and through the bushing, the opposite end of the links being connected by the bolt 28 to the end 29 of said spring. By this arrangement it will be seen that the roller 23 at the inner end of the auxiliary spring rests upon the back of the main spring 24 and rolls back and forth as the spring vibrates. In some cases it is found when the main spring recoils sharply that it is apt to throw the roll 23 from contact with the back thereof and to prevent such action I have formed a U shaped strap 30 positioned around beneath the spring and connected at its ends 31 to the pivot bolt 22.

It is found in practice that even a straight member 32 such as that illustrated in Fig. 3 will be quite effective as a shock absorbing device for reducing the recoil or rebounding action upon the main spring 24, but when greater resiliency is desired any number of coils such as those illustrated at 18 and 19 or even more may be employed with good results.

It is found in practice that by constructing my improved shock absorbing device of two spaced apart members, each having one or more coils in its construction, renders the device very yieldable yet strong, durable and practical, and as this arrangement permits of the connecting of the device to either side of the hanger or support 16, it thus prevents the longitudinal swaying motion of the vehicle body, which is supported from this device through the spring and links 27.

Another feature of my improved construction is that the second coil 19 in addition to providing increased flexibility, also serves to provide a convenient bearing eye for receiving the hanger bolt 26 from which the main spring is suspended.

My improved shock absorbing device is extremely simple in construction and effective in its operation and may be readily applied to a vehicle of the transverse spring construction by using the original brackets and without the necessity of drilling holes into any of its parts and by its use the riding qualities of the vehicle are greatly improved.

I claim:

1. In a vehicle spring the combination with a main spring of an auxiliary spring having one end pivotally supported on a vehicle element and its opposite end bearing against said main spring, the end of the main spring being supported from the auxiliary spring at a point intermediate the ends of the latter.

2. A compound spring for vehicles comprising a main spring, an auxiliary spring at either end of said main spring, each of said auxiliary springs having one end pivotally supported on a vehicle element and its opposite end bearing against said main spring, the main spring being supported from the auxiliary spring at a point intermediate its ends.

3. A compound spring for vehicles comprising a main spring, an auxiliary spring at either end of said main spring, each of said auxiliary springs having one end pivotally supported on a vehicle element and its opposite end bearing against said main spring, the main spring being supported from the auxiliary spring at a point intermediate the ends of the auxiliary spring, and a coil in the auxiliary spring between the pivoted point and the point of support of said main spring.

4. A compound spring for vehicles comprising a main spring, an auxiliary spring at either end of said spring, each of said auxiliary springs having one end pivotally supported on a vehicle element and its opposite end bearing against said main spring, the main spring being supported from the auxiliary spring at a point intermediate the ends thereof, and means on said opposite end for preventing the auxiliary spring from leaving the main spring as the latter recoils.

5. A shock absorbing device comprising a vehicle spring, a yieldable member at one end of the vehicle spring, said member having one end supported by a vehicle element, and its opposite end supported by said spring, and means connecting one end of said spring to said member at a point intermediate the ends of the latter.

6. A shock absorbing device comprising a vehicle spring, a yieldable member at either end of the vehicle spring, each of said members having one end supported by a vehicle element and its opposite end supported by said spring, means connecting the ends of the spring to said members at points intermediate the ends of said members, said members being provided with one or more coils to increase their yieldability.

7. A shock absorber comprising a pair of spaced apart resilient side arms arranged to lie approximately parallel with the axis of the vehicle spring, each of said arms being provided with one or more coils intermediate its ends, one end of said pair being adapted to be pivotally supported from the vehicle axle and its opposite ends to be supported on the back of the spring and means for connecting the end of the spring to said arms at a point intermediate their ends.

8. A shock absorber comprising a pair of spaced apart resilient side arms arranged to lie approximately parallel with the axis of the vehicle spring, each of said arms being provided with one or more coils intermediate its ends, one end of said pair being adapted to be pivotally supported from the vehicle axle and its opposite ends to be supported on the back of the spring and means for connecting the end of the spring to said arms through on of said coils.

In testimony whereof I affix my signature in presence of two witnesses.

EUGENE FULLER.

Witnesses:
 HOWARD E. BARLOW,
 A. F. MACREADY.